(12) United States Patent
Sasaki et al.

(10) Patent No.: US 9,517,707 B2
(45) Date of Patent: Dec. 13, 2016

(54) SEAT SLIDE DEVICE FOR VEHICLE

(71) Applicant: THK CO., LTD., Tokyo (JP)

(72) Inventors: Soichi Sasaki, Tokyo (JP); Masashi Konomoto, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/652,193

(22) PCT Filed: Dec. 27, 2013

(86) PCT No.: PCT/JP2013/085215
§ 371 (c)(1),
(2) Date: Jun. 15, 2015

(87) PCT Pub. No.: WO2014/104344
PCT Pub. Date: Jul. 3, 2014

(65) Prior Publication Data
US 2015/0321582 A1 Nov. 12, 2015

(30) Foreign Application Priority Data
Dec. 28, 2012 (JP) ................. 2012-286785

(51) Int. Cl.
*F16M 13/00* (2006.01)
*B60N 2/07* (2006.01)
*F16C 29/04* (2006.01)

(52) U.S. Cl.
CPC .............. *B60N 2/0722* (2013.01); *B60N 2/07* (2013.01); *B60N 2/071* (2013.01); *B60N 2/072* (2013.01);
(Continued)

(58) Field of Classification Search
CPC ......... B60N 2/072; B60N 2/07; B60N 2/0722; B60N 2/0715; B60N 2/0727; B60N 2/071; B60N 2/073; F16C 29/04
(Continued)

(56) References Cited

U.S. PATENT DOCUMENTS 2,400,374 A * 5/1946 Selnes ................... F16C 19/505
384/49
4,592,735 A * 6/1986 Orain ................... F16C 19/505
384/44
(Continued)

FOREIGN PATENT DOCUMENTS

EP      0 771 689 A2   5/1997
GB      2 219 933 A    12/1989
(Continued)

OTHER PUBLICATIONS

International Search Report dated Feb. 10, 2014, issued in corresponding application No. PCT/JP2013/085215 (2 pages).
(Continued)

*Primary Examiner* — Gwendolyn Baxter
(74) *Attorney, Agent, or Firm* — Westerman, Hattori, Daniels & Adrian, LLP

(57) ABSTRACT

Provided is a seat slide device for a vehicle capable of enhancing the degree of design freedom in an interior height of a vehicle cabin, light-weighting the vehicle, and enhancing comfort in use when a seat is moved forward and rearward. The seat slide device for a vehicle includes: an upper rail made of an aluminum alloy, including a sliding section having a plurality of ball rolling grooves each formed along a longitudinal direction of the upper rail; a lower rail made of an aluminum alloy, including: a guide groove for receiving the sliding section of the upper rail; and ball rolling grooves each formed in the guide groove along a longitudinal direction of the lower rail to be opposed to the plurality of ball rolling grooves of the sliding section; and a large number of guide balls each made of a synthetic resin, for supporting movement of the upper rail relative to the lower rail, the large number of guide balls being arrayed in line without using a cage in a portion between each of the plurality of ball rolling grooves and each of the ball rolling grooves.

5 Claims, 4 Drawing Sheets

(52) U.S. Cl.
CPC ............. *B60N 2/073* (2013.01); *B60N 2/0715* (2013.01); *B60N 2/0727* (2013.01); *F16C 29/04* (2013.01)

(58) Field of Classification Search
USPC ... 248/429, 430; 296/65.18, 65.05; 297/341; 384/46, 47
See application file for complete search history.

(56) References Cited

U.S. PATENT DOCUMENTS

| | | | | |
|---|---|---|---|---|
| 5,009,521 | A | * | 4/1991 | Wiebe ..................... B61F 5/305 105/224.1 |
| 5,192,045 | A | | 3/1993 | Yamada et al. |
| 5,213,300 | A | * | 5/1993 | Rees ..................... B60N 2/0715 248/429 |
| 5,417,496 | A | * | 5/1995 | Hobbs ..................... A47B 88/10 384/18 |
| 5,737,971 | A | * | 4/1998 | Riefe ..................... B62D 1/181 280/775 |
| 6,036,253 | A | | 3/2000 | Garrido |
| 2003/0206669 | A1 | * | 11/2003 | Smith ..................... B60N 2/071 384/47 |
| 2007/0181769 | A1 | | 8/2007 | Chung et al. |
| 2011/0278420 | A1 | | 11/2011 | Kitamura et al. |

FOREIGN PATENT DOCUMENTS

| | | |
|---|---|---|
| JP | 7-22828 U | 4/1995 |
| JP | 8-230528 A | 9/1996 |
| JP | 2000-62504 A | 2/2000 |
| JP | 2000-142187 A | 5/2000 |
| JP | 2007-210597 A | 8/2007 |
| JP | 2009-197818 A | 9/2009 |
| JP | 2010-12849 A | 1/2010 |
| JP | 2011-235788 A | 11/2011 |
| WO | 00/29250 A1 | 5/2000 |
| WO | 2008/46434 A1 | 12/2008 |

OTHER PUBLICATIONS

Extended European Search Report dated Dec. 11, 2015, issued in counterpart European Patent Application No. 13866659.9. (8 pages).

* cited by examiner

SEAT SLIDE DEVICE FOR VEHICLE

TECHNICAL FIELD

The present invention relates to a seat slide device for a vehicle, which is configured to support an occupant seat of various vehicles so as to be movable forward and rearward relative to a vehicle floor.

BACKGROUND ART

Hitherto, as this type of seat slide device for a vehicle, a seat slide device for a vehicle as disclosed in, for example, Patent Literature 1 [PTL 1] is known. The seat slide device for a vehicle includes a lower rail, which is to be fixed to a vehicle floor, an upper rail, which is to be fixed to a seat and supported so as to be freely movable relative to the lower rail, and rolling elements such as rollers or balls, which are each made of steel and arranged in a portion between the lower rail and the upper rail. The lower rail and the upper rail are each formed by bending a metal plate into a predetermined shape through roll forming or press working, and the rolling elements are arranged only in two regions on each of those lower rail and upper rail, which are respectively closer to a front end and a rear end thereof in a longitudinal direction. Further, in order to maintain a constant interval between the rolling elements arranged in the two regions at the front and rear of each rail, rolling element cages extending in the longitudinal direction of the rail are each arranged in a gap between the lower rail and the upper rail. The rolling element cage is also formed by bending the metal plate.

CITATION LIST

Patent Literature

[PTL 1] JP 2010-12849 A

DISCLOSURE OF THE INVENTION

Problem to be Solved by the Invention

In such a related-art seat slide device for a vehicle, the rolling elements are arranged only in the two regions on each of the lower rail and the upper rail, which are respectively closer to the front end and the rear end in the longitudinal direction. Thus, a load applied to each rolling element is large, thereby being necessary to use rolling elements each having a large diameter. Accordingly, a height from a surface of the lower rail, which is fixed to the vehicle floor, to a seat mounting position of the upper rail becomes larger, which adversely affects the design of an interior height of a vehicle cabin.

Further, the load applied to each rolling element is large, and hence contact pressure becomes larger between the lower rail and the rolling element and between the upper rail and the rolling element. As a result of consideration of wear due to long-term use, the lower rail and the upper rail are each manufactured of a steel plate. Accordingly, the weight of the seat slide device is increased, which adversely affects fuel economy of the vehicle.

Means for Solving the Problems

Therefore, it is an object of the present invention to provide a seat slide device for a vehicle capable of enhancing the degree of design freedom in an interior height of a vehicle cabin, and light-weighting the vehicle.

In order to achieve the above-mentioned object, according to one embodiment of the present invention, there is provided a seat slide device for a vehicle, including: an upper rail made of an aluminum alloy, the upper rail including: a mounting section to be fixed to a seat; and a sliding section having a plurality of ball rolling grooves each formed along a longitudinal direction of the upper rail; a lower rail made of an aluminum alloy, the lower rail including: a fixing section to be fixed to a vehicle floor; a guide groove for receiving the sliding section of the upper rail; and ball rolling grooves each formed in the guide groove along a longitudinal direction of the lower rail to be opposed to the plurality of ball rolling grooves of the sliding section; and a large number of guide balls each made of a synthetic resin, for supporting movement of the upper rail relative to the lower rail, the large number of guide balls being arrayed in line without using a cage in a portion between each of the plurality of ball rolling grooves of the upper rail and each of the ball rolling grooves of the lower rail, which are opposed to each other.

Effects of the Invention

According to the seat slide device for a vehicle of the one embodiment of the present invention, which is structured as described above, the large number of guide balls are arrayed without using the cage on the ball rolling grooves of the lower rail and the upper rail. With this, the movement of the upper rail relative to the lower rail is supported, and hence a load applied to each guide ball is reduced, thereby being capable of reducing a diameter of the guide ball. Thus, a height from a bottom surface of the lower rail to a seat mounting position of the upper rail is reduced, thereby being capable of securing the degree of design freedom in the interior height of the vehicle cabin.

Further, with the large number of guide balls arrayed on the ball rolling grooves of the lower rail and the upper rail, the load applied to each guide ball is reduced, and hence contact pressure between each guide ball and each of the rails is reduced. In addition, the ball made of a synthetic resin is larger in amount of deformation caused due to the load than a ball made of steel. Also in this respect, the contact pressure between each guide ball and each of the rails is reduced. Thus, the lower rail and the upper rail can be manufactured of an aluminum alloy instead of a steel plate, and hence the seat slide device is light-weighted, thereby being capable of contributing to improvement in fuel economy of the vehicle.

MODE FOR CARRYING OUT THE INVENTION

Now, a seat slide device for a vehicle according to the present invention is described in detail referring to the attached drawings.

Figure 1:
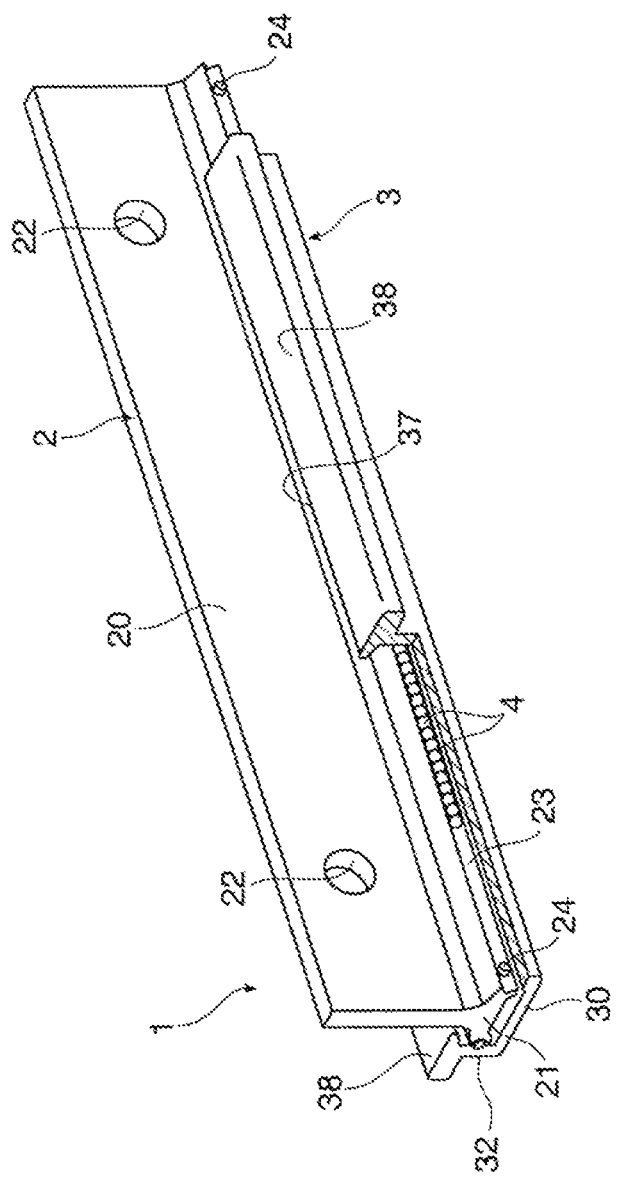
FIG. 1 is a partially cut-out perspective view of a seat slide device for a vehicle according to a first embodiment of the present invention.
Figure 2:
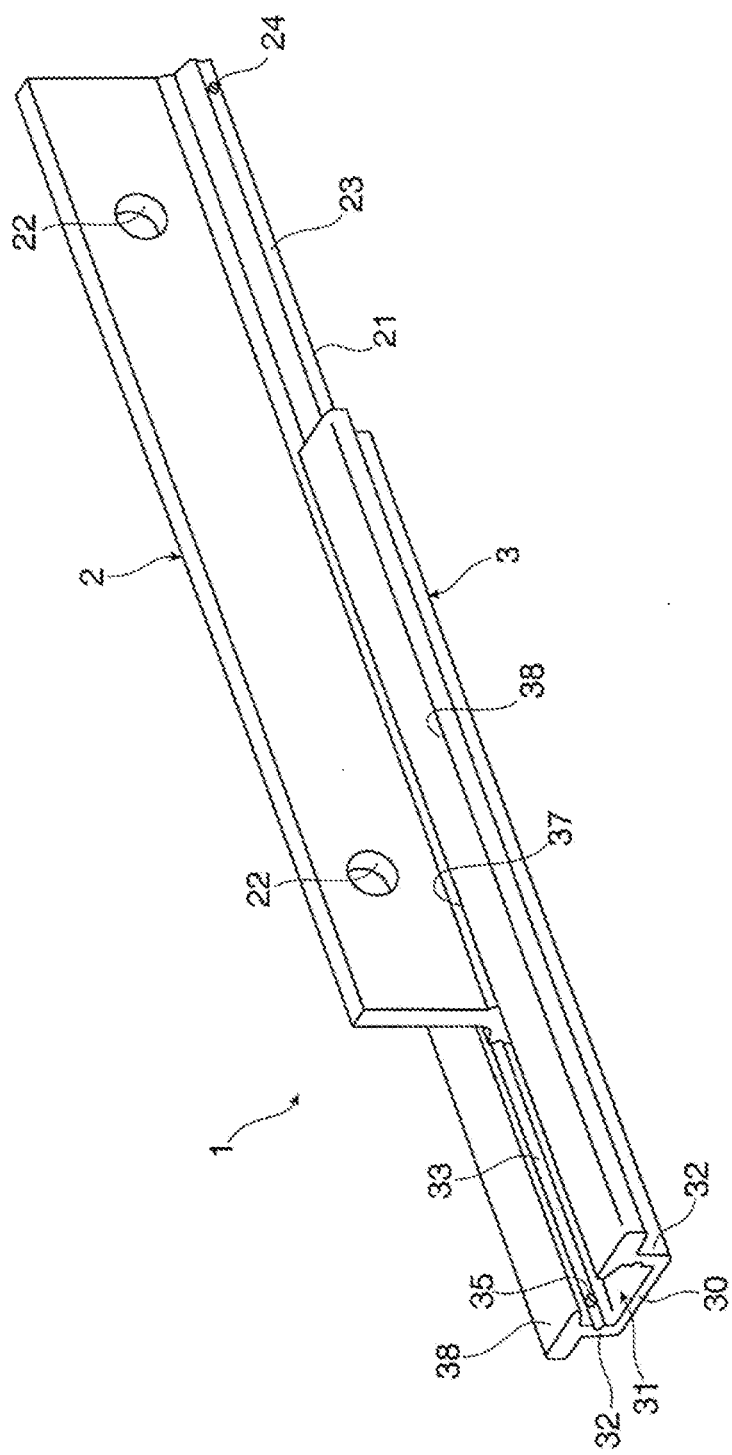
FIG. 2 is a perspective view of a state in which an upper rail of the seat slide device for a vehicle in FIG. 1 is moved relative to a lower rail thereof.
Figure 3:
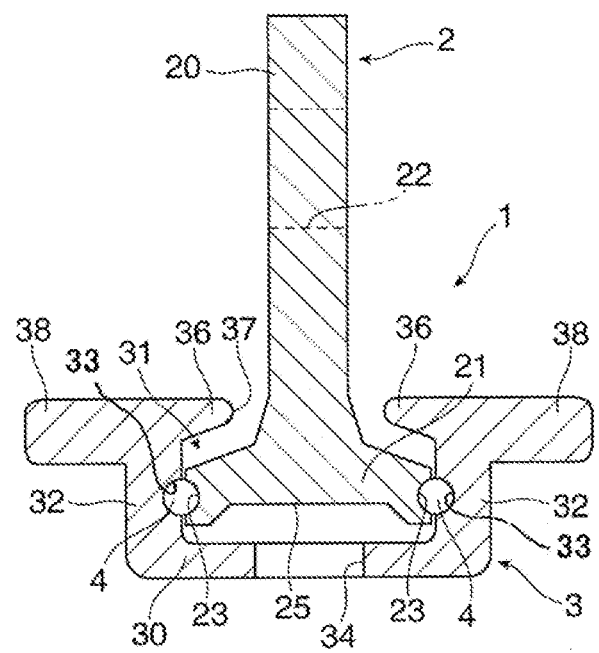
FIG. 3 is a front sectional view of the seat slide device for a vehicle in FIG. 1.

FIG. 1 to FIG. 3 are illustrations of a seat slide device for a vehicle according to a first embodiment of the present invention. A seat slide device 1 includes an upper rail 2 on which an occupant seat of the vehicle is to be mounted, a lower rail 3 to be fixed to a vehicle floor, and a large number of guide balls 4 arrayed along a longitudinal direction of each of the upper rail 2 and the lower rail 3 in a portion between those rails. The guide balls 4 are configured to roll in the portion between, and thus the upper rail 2 is freely movable relative to the lower rail 3 as illustrated in FIG. 2.

The upper rail 2 includes a plate-like mounting section 20 to be fixed to leg portions of the occupant seat, and a sliding section 21 formed on a lower end of the mounting section 20 so as to be orthogonal to the mounting section 20. The upper rail 2 is formed to be elongated along a direction of movement relative to the lower rail 3, and has a substantially T-like uniform shape in a cross section perpendicular to the direction of movement. Further, bolt mounting holes 22 to be used for fixing the upper rail to the leg portions of the occupant seat are formed in the mounting section 20. Note that, the shape of the upper rail 2 in this embodiment is merely an example, and for example, the mounting section 20 and the sliding section 21 may cross each other in a substantially L-like shape.

On each of side surfaces of the sliding section 21, which face sides opposite to each other, one ball rolling groove 23 is formed along the longitudinal direction of the upper rail 2. The guide balls 4 are configured to roll on the ball rolling groove 23. Further, a stopper 24 is formed to slightly protrude from the ball rolling groove 23 in the vicinity of each end of the ball rolling groove 23 in the longitudinal direction. With this, a rolling range of the guide balls 4 in the ball rolling groove 23 is restricted. Note that, a depressed portion 25 is formed in a lower surface side of the sliding section 21, that is, a surface of the sliding section 21 on a side opposite to the mounting section 20. The depressed portion 25 is formed for the purpose of avoiding interference with a head of a bolt for fixing the lower rail 3 to the vehicle floor.

On the other hand, the lower rail 3 is formed to be elongated along the direction of movement of the upper rail 2, and includes a fixing section 30 to be fixed to the vehicle floor, and a guide groove 31 for receiving the sliding section 21 of the upper rail 2. Bolt mounting holes 34 to be used for fixing the lower rail to the vehicle floor are formed in the fixing section. Further, the lower rail 3 includes a pair of side wall sections 32 formed upright from the fixing section 30, and those side wall sections 32 are formed on both sides of the fixing section 30 with a distance therebetween. Each side wall section 32 extends along the direction of movement of the upper rail 2. Therefore, in this embodiment, a space enclosed by those fixing section 30 and pair of side wall sections 32 corresponds to the guide groove 31.

A ball rolling groove 33 is formed in an inner side surface of each side wall section 32, which faces the guide groove 31, along the longitudinal direction of the lower rail 3. The ball rolling groove 33 is opposed to the ball rolling groove 23 formed in the sliding section 21 of the upper rail 2. The guide balls 4 are configured to roll while being held in contact with both the ball rolling groove 23 of the upper rail 2 and the ball rolling groove 33 of the lower rail 3. Accordingly, the upper rail 2 is restrained by the lower rail 3 in a direction orthogonal to the direction of its movement, and thus is freely movable relative to the lower rail 3 while bearing any load applied in the direction orthogonal to the direction of its movement. Note that, similarly to the ball rolling groove 23 of the upper rail 2, a stopper 35 is formed to slightly protrude from the ball rolling groove 33 in the vicinity of each end of the ball rolling groove 33 of the lower rail 3 in the longitudinal direction. With this, a rolling range of the guide balls 4 in the ball rolling groove 33 is restricted.

In the seat slide device according to the present invention, the two ball rolling grooves 23 and the two ball rolling grooves 33 are formed respectively in the upper rail 2 and the lower rail 3. The upper rail 2 is supported so as to be freely movable relative to the lower rail 3 with only two rows of balls configured to roll on those ball rolling grooves 23 and 33. Thus, the sliding section 21 of the upper rail 2 and the guide groove 31 of the lower rail 3 can be downsized so that a height from the fixing section 30 of the lower rail 3 to the mounting section 20 of the upper rail 2 is reduced.

Further, the lower rail 3 includes a pair of locking walls 36 covering an upper part of the guide groove 31. Those locking walls 36 each protrude from an upper end of the side wall section 32 toward a center of the guide groove 31, and extend along the longitudinal direction of the lower rail 3. Distal ends of the pair of locking walls 36 are opposed to each other, and form an opening portion 37 for allowing the movement of the upper rail 2. An opening width of the opening portion 37, which is orthogonal to the direction of movement of the upper rail 2, is set smaller than a lateral width of the sliding section 21 of the upper rail 2, that is, a length between both the side surfaces of the sliding section 21, in which the ball rolling grooves 23 are formed. Accordingly, it is possible to prevent a situation in which the upper rail 2 is separated from the lower rail 3 even when a load of pulling out the upper rail 2 upward from the guide groove 31 of the lower rail 3 is excessively applied to the upper rail 2 so that the guide balls 4 drop off the ball rolling groove 23 of the upper rail 2 or the ball rolling groove 33 of the lower rail 3. Therefore, the occupant seat is not disengaged from the vehicle floor.

In addition, a reinforcement protruding section 38 is formed on an outer side surface of each side wall section 32 of the lower rail 3. The reinforcement protruding section 38 extends along the longitudinal direction of the lower rail 3, and is formed to have a larger cross-sectional area than the locking wall 36 in a cross section orthogonal to the direction of movement of the upper rail 2. With the reinforcement protruding section 38, even when a load is locally applied from the upper rail 2 to the lower rail 3 through intermediation of the guide balls 4, deformation of the lower rail 3 can be prevented.

The upper rail 2 and the lower rail 3 are manufactured through extrusion molding using an aluminum alloy. The upper rail 2 and the lower rail 3 each have a uniform shape in a cross section perpendicular to the longitudinal direction, and hence are suitable for manufacture through the extrusion molding. In this case, the bolt mounting holes 22 and 34 are processed after the extrusion molding, and the stoppers 24 and 35 to be formed on the ball rolling grooves 23 and 33 are also processed after the extrusion molding. The ball rolling grooves 23 and 33 are simultaneously formed at the time of the extrusion molding, and surfaces of the ball rolling grooves 23 and 33 are not subjected to any special processing after the extrusion molding. Therefore, both the upper rail 2 and the lower rail 3 can be manufactured at low cost.

Further, as the stopper 24 of the upper rail and the stopper 35 of the lower rail, stoppers formed as separate members may be fixed to the ball rolling grooves 23 and 33 formed through the extrusion molding, or parts of the upper rail 2 and the lower rail 3 may be bent upright to form stoppers.

The upper rail 2 is supported so as to be freely movable relative to the lower rail 3 only by the guide balls 4 arrayed on the ball rolling groove 23, and the upper rail 2 and the lower rail 3 are not directly held in contact with each other. As illustrated in FIG. 1, the guide balls 4 are arrayed in line on the ball rolling grooves 23 and 33 without using a cage for maintaining a constant array interval. Thus, a larger number of the guide balls 4 are arrayed in a portion between the ball rolling groove 23 of the upper rail 2 and the ball rolling groove 33 of the lower rail 3 than in the case of securing a predetermined clearance between adjacent balls using the cage, with the result that contact pressure between each guide ball 4 and the upper rail 2 or the lower rail 3 can be reduced.

Further, the guide balls 4 for supporting the upper rail 2 relative to the lower rail 3 are each made of a synthetic resin. The guide ball 4 made of a synthetic resin is larger in amount of deformation caused due to the load than a ball made of steel, and hence the contact area between each guide ball 4 and each of the ball rolling grooves 23 and 33 is increased, thereby being capable of correspondingly reducing the contact pressure between each guide ball 4 and the upper rail 2 and between each guide ball 4 and the lower rail 3. Therefore, it is preferred that the synthetic resin forming the guide ball 4 have a Young's modulus lower than the upper rail 2 and the lower rail 3 each made of an aluminum alloy. Thus, it is possible to prevent wear of the upper rail 2 and the lower rail 3 along with use over time, and formation of indentation on the ball rolling grooves 23 and 33 of the rails 2 and 3. For example, a ball made of polyacetal (POM) may be used as the guide ball 4.

Figure 4:
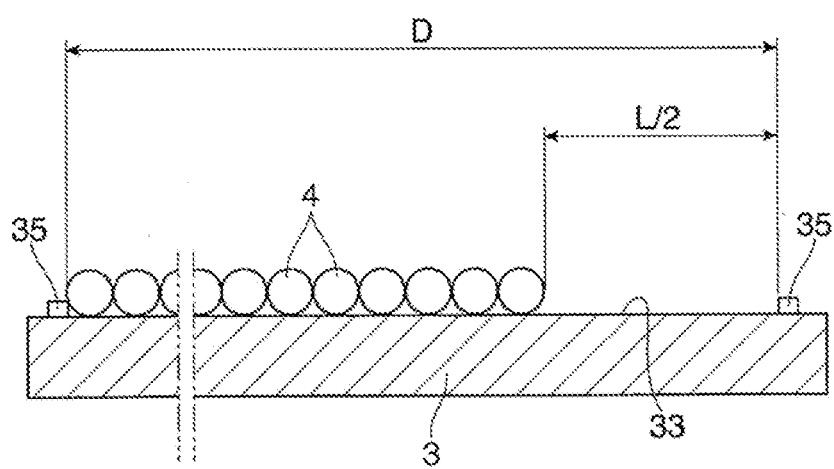
FIG. 4 is a schematic view of a length of array of balls in a ball rolling groove.

A length of array of the guide balls 4 in the ball rolling groove 23 of the upper rail 2 and the ball rolling groove 33 of the lower rail 3 is determined in the following manner. For example, assuming that "L" represents a stroke amount required for positional adjustment for the occupant seat in a vehicle cabin, that is, a maximum movable length of the upper rail 2 relative to the lower rail 3, the guide balls 4 roll on the ball rolling grooves 23 and 33 by a length L/2 while the upper rail 2 moves by the length L. Accordingly, as illustrated in FIG. 4, assuming that "D" represents an effective length of the ball rolling groove 33 of the lower rail 3, that is, a length between the pair of stoppers 35 positioned on both ends of the lower rail 3, it is preferred that the guide balls 4 be arrayed on the ball rolling groove 33 with only the length L/2 left in the ball rolling groove 33. Thus, the number of the balls 4 arrayed on the ball rolling grooves 23 and 33 can be maximized. Note that, in this embodiment, the lower rail 3 is formed shorter than the upper rail 2, and hence the ball rolling groove 33 of the lower rail 3 is described as an example in FIG. 4. However, when the upper rail 2 is shorter than the lower rail 3, the same idea is applied to the ball rolling groove of the upper rail 2.

As described above, in this embodiment, the length of array of the guide balls 4 in the ball rolling grooves 23 and 33 is determined based on a relationship between the maximum movable length L of the upper rail 2, which is required for the seat slide device 1, and the effective length D of the ball rolling grooves 23 and 33. The guide balls 4 are arrayed as many as possible within the above-mentioned range.

In the seat slide device for a vehicle according to this embodiment, which is structured as described above, the large number of guide balls 4 are arrayed on the ball rolling grooves 23 and 33 of the upper rail 2 and the lower rail 3. In addition, the guide balls 4 are arrayed as many as possible without using the cage, and the upper rail 2 is supported so as to be freely movable relative to the lower rail 3 with those rolling guide balls 4. Thus, even when a load required to be borne by the seat slide device 1 is large, the load applied to each guide ball 4 can be reduced. Accordingly, the guide ball 4 to be used can be reduced in diameter so that the upper rail 2 and the lower rail 3 are downsized and thinned, thereby reducing a height from a bottom surface of the lower rail 3 to a seat mounting position of the upper rail 2. In this manner, it is possible to secure the degree of design freedom in an interior height of the vehicle cabin.

Further, the load applied to each guide ball 4 can be reduced so that the contact pressure between each guide ball 4 and the upper rail 2 and between each guide ball 4 and the lower rail 3 is reduced. In addition, with the use of the guide ball 4 made of a synthetic resin, which is larger in amount of deformation caused due to the load than the ball made of steel, when the load is applied, the contact area between each guide ball 4 and each of the ball rolling grooves 23 and 33 is increased, and the contact pressure is further reduced. Thus, the upper rail 2 and the lower rail 3 can each be made of an aluminum alloy. As a result, it is possible to provide a seat slide device that is lightweight as compared to the related-art seat slide device made of steel, thereby being capable of contributing to improvement in fuel economy of the vehicle.

In addition, the contact pressure between each guide ball 4 and the upper rail 2 and between each guide ball 4 and the lower rail 3 is low, and hence wear of the ball rolling grooves 23 and 33 can be reduced. Thus, it is possible to provide a seat slide device that is reduced in generation of dust and longer in life.

Further, the movement of the upper rail is supported by the guide balls 4 each made of a synthetic resin, thereby being capable of suppressing generation of running noise of the guide balls 4 when the upper rail 2 is moved relative to the lower rail 3, and also preventing generation of annoying metallic noise.

In addition, the pair of locking walls 36 covering the upper part of the guide groove 31 is formed on the lower rail 3, and hence even when the guide balls 4 drop off the ball rolling grooves 23 and 33 due to an excessive load applied to the upper rail 2, the sliding section 21 of the upper rail 2 can be prevented from being separated from an inside of the guide groove 31 of the lower rail 3. Thus, it is possible to prevent disengagement of the occupant seat form the vehicle floor.

Figure 5:
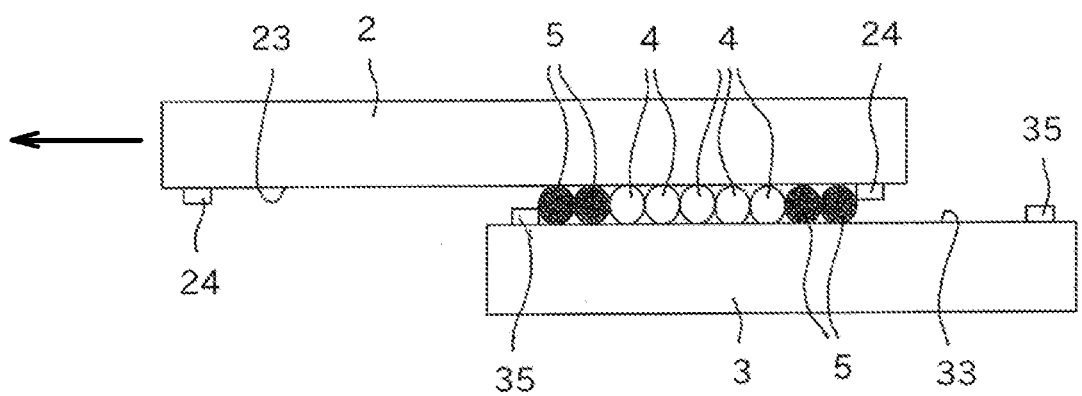
FIG. 5 is a schematic view of array of balls in a seat slide device for a vehicle according to a second embodiment of the present invention.

Next, a seat slide device for a vehicle according to a second embodiment of the present invention is described referring to FIG. 5.

In the seat slide device according to the second embodiment, two types of balls made of materials different from each other, that is, the guide balls 4 and high-strength balls 5 are arrayed on the ball rolling grooves 23 and 33 of the upper rail 2 and the lower rail 3. In this manner, load bearing performance is enhanced as compared to that in the above-mentioned first embodiment.

FIG. 5 is a schematic view of a state in which the upper rail 2 is moved relative to the lower rail 3 in a direction indicated by the arrow to the fullest extent, that is, a state in which the upper rail 2 is moved to a terminal end of the stroke relative to the lower rail 3. In this state, a row of balls including the guide balls 4 and the high-strength balls 5 is sandwiched by the stopper 24 of the upper rail 2 and the stopper 35 of the lower rail 3. In this manner, further movement of the upper rail 2 in the direction indicated by the arrow is restricted. In the illustration of FIG. 5, only the high-strength balls 5 are colored black to distinguish the high-strength balls 5 from the guide balls 4.

The high-strength ball 5 is positioned on each end of the guide balls 4 in an array direction. That is, the high-strength balls 5 are arranged in the front and rear of a group of the guide balls 4 on the ball rolling grooves 23 and 33 in a rolling direction. Further, the high-strength ball 5 is made of a material having a Young's modulus higher than that of the guide ball 4. For example, the high-strength ball 5 may be made of ceramics or metal such as steel. Further, the high-strength ball 5 may be made of a synthetic resin as long as the material has a Young's modulus higher than that of the guide ball 4.

As understood from FIG. 5, under a state in which the upper rail 2 is moved relative to the lower rail 3 in the direction indicated by the arrow to the fullest extent, the high-strength ball 5 is held in contact with each of the stoppers 24 and 35. Accordingly, when the upper rail 2 is to be further moved in the direction indicated by the arrow from the state in FIG. 5, each of the stoppers 24 and 35 is to strongly press the high-strength ball 5. In this case, the high-strength ball 5 has a Young's modulus higher than the guide ball 4, and hence the high-strength ball 5 is smaller in amount of deformation than in the case where each of the stoppers 24 and 35 is directly held in contact with the guide ball 4 to deform the guide ball 4.

Accordingly, it is possible to minimize a risk in that the ball climbs over the stopper 24 of the upper rail 2 or the stopper 35 of the lower rail 3 as compared to the case where only the guide balls 4 are arrayed on the ball rolling grooves 23 and 33 as in the above-mentioned first embodiment. That is, in the seat slide device according to the second embodiment, load bearing performance in a stroke direction of the upper rail 2 is enhanced.

Further, as one required performance of the seat slide device for a vehicle, so-called belt-anchor strength is given. The belt-anchor strength is satisfied under the following conditions. Specifically, on the premise that an occupant who sits on an occupant seat fastens his/her seatbelt, even when a predetermined pulling load is applied to an anchor of the seat belt for a certain period of time, the upper rail 2 itself of the seat slide device for a vehicle is not broken, and the upper rail 2 is not separated from the lower rail 3 fixed to the vehicle floor. In this case, a direction of the pulling load applied to the anchor has an angle of less than 90° with respect to the stroke direction of the upper rail 2, and hence a moment load generated due to the pulling load is applied to the upper rail 2.

In this case, in the row of balls arrayed on the ball rolling grooves 23 and 33, a lager load is applied to a ball positioned in the vicinity of each end of the row of balls than a ball positioned in the vicinity of a center thereof. Accordingly, in the seat slide device according to the second embodiment in which the high-strength balls 5 each having a higher Young's modulus are arranged on each end of the row of balls, load bearing performance on the moment load is enhanced as compared to the case where only the guide balls 4 are arrayed on the ball rolling grooves 23 and 33 as in the above-mentioned first embodiment.

Considering the load bearing performance in the stroke direction of the upper rail 2, it suffices that at least one high-strength ball 5 be arranged on each end of the group of the guide balls 4. However, considering the load bearing performance on the moment load, it is effective that at least two high-strength balls 5 be arranged on each end of the group of the guide balls 4.

Note that, the material of the high-strength ball 5 has a Young's modulus higher than that of the guide ball 4, and hence the high-strength ball 5 is smaller in amount of deformation caused due to the load so that contact pressure between the high-strength ball 5 and the upper rail 2 and between the high-strength ball 5 and the lower rail 3 tends to be higher. Accordingly, when a ratio of the number of the high-strength balls 5 to the number of the guide balls 4 is increased, dust or fatigue fracture is correspondingly easily generated on each of the rails 2 and 3. From the above-mentioned viewpoint, it is preferred that the number of the high-strength balls 5 be set smaller than the number of the guide balls 4.

Further, the guide balls 4 and the high-strength balls 5 configured to roll on the ball rolling grooves 23 and 33 are slightly elastically deformed in accordance with a magnitude of a load applied thereto. However, when the moment load is applied to the upper rail 2 as described above, a larger load is applied to the high-strength ball 5 arranged on each end of the guide balls 4 in the rolling direction than to the guide ball 4. Accordingly, it is preferred that a diameter of the high-strength ball 5 be set slightly larger than the diameter of the guide ball 4 in order to prevent application of an excessive load to the guide ball 4 adjacent to the high-strength ball 5 when the moment load is applied. Even when the diameter of the high-strength ball 5 is set slightly larger than the diameter of the guide ball 4 as described above, the high-strength ball 5 is subjected to the load to be deformed, and hence the guide ball 4 is reliably held in contact with each of the upper rail 2 and the lower rail 3 to also bear the load, with the result that the upper rail 2 is supported by all the balls 4 and 5 arrayed on the ball rolling groove 23.

Note that, the above-mentioned seat slide device for a vehicle according to each of the first and second embodiments is merely an example to which the present invention is applied. The design variations may appropriately be made in shape, length, or material of each of the upper rail and the lower rail, number or direction of the ball rolling grooves, or material or number of the balls to be arrayed without departing from the gist of the present invention.

The invention claimed is:
1. A seat slide device for a vehicle, comprising:
an upper rail made of an aluminum alloy, the upper rail comprising:
  a mounting section to be fixed to a seat; and
  a sliding section having a plurality of ball rolling grooves each formed along a longitudinal direction of the upper rail;
a lower rail made of an aluminum alloy, the lower rail comprising:
  a fixing section to be fixed to a vehicle floor;
  a guide groove for receiving the sliding section of the upper rail; and
  ball rolling grooves each formed in the guide groove along a longitudinal direction of the lower rail to be opposed to the plurality of ball rolling grooves of the sliding section;
a plurality of guide balls each made of a synthetic resin, for supporting movement of the upper rail relative to the lower rail, the plurality of guide balls being arrayed in line without using a cage in a portion between each of the plurality of ball rolling grooves of the upper rail and each of the ball rolling grooves of the lower rail, which are opposed to each other; and at least two high-strength balls each made of a material having a Young's modulus higher than each of the plurality of guide balls, the high-strength balls being disposed such that the plurality of guide balls are sandwiched between said at least two high-strength balls, in an array direction on each of the plurality of ball rolling grooves of the upper rail and the ball rolling grooves of the lower rail.

2. The seat slide device for the vehicle according to claim 1, wherein a Young's modulus of the synthetic resin forming each of the plurality of guide balls is lower than a Young's modulus of each of the upper rail and the lower rail.

3. The seat slide device for the vehicle according to claim 1, wherein a diameter of each of the high-strength balls is larger than a diameter of each of the plurality of guide balls.

4. The seat slide device for the vehicle according to claim 1, wherein the lower rail further comprises a pair of side wall sections each formed upright from the fixing section, wherein the guide groove is formed between the pair of side wall sections, wherein the ball rolling grooves are formed in inner side surfaces of the pair of side wall sections, which face the guide groove, and wherein the lower rail further comprises locking walls formed on upper ends of the pair of side wall sections to prevent separation of the sliding section of the upper rail, which is received in the guide groove.

5. The seat slide device for the vehicle according to claim 4, further comprising reinforcement protruding sections formed on outer side surfaces of the pair of side wall sections of the lower rail along the longitudinal direction of the lower rail.

* * * * *